US008082248B2

(12) United States Patent
Abouyounes

(10) Patent No.: US 8,082,248 B2
(45) Date of Patent: Dec. 20, 2011

(54) METHOD AND SYSTEM FOR DOCUMENT CLASSIFICATION BASED ON DOCUMENT STRUCTURE AND WRITTEN STYLE

(75) Inventor: Rania Abouyounes, Windsor (CA)

(73) Assignee: Rania Abouyounes, Windsor, ON, CA (US)

( * ) Notice: Subject to any disclaimer, the term of this patent is extended or adjusted under 35 U.S.C. 154(b) by 470 days.

(21) Appl. No.: 12/129,596

(22) Filed: May 29, 2008

(65) Prior Publication Data

US 2009/0300046 A1  Dec. 3, 2009

(51) Int. Cl.
*G06F 7/04* (2006.01)
*G06F 7/06* (2006.01)

(52) U.S. Cl. .......................... 707/731; 707/739
(58) Field of Classification Search ............... 707/771, 707/999.007, 731, 739
See application file for complete search history.

(56) References Cited

U.S. PATENT DOCUMENTS

| | | | |
|---|---|---|---|
| 5,424,947 A | 6/1995 | Nagao | |
| 5,619,709 A | 4/1997 | Caid | |
| 5,761,631 A | 6/1998 | Nasukawa | |
| 5,963,940 A | 10/1999 | Liddy | |
| 6,189,002 B1 | 2/2001 | Roitblat | |
| 6,233,575 B1 | 5/2001 | Agrawal | |
| 6,327,593 B1 | 12/2001 | Goiffon | |
| 6,490,579 B1 | 12/2002 | Gao | |
| 6,505,195 B1 | 1/2003 | Ikeda | |
| 6,633,868 B1 | 10/2003 | Min | |
| 6,675,159 B1 | 1/2004 | Lin | |
| 6,691,108 B2 | 2/2004 | Li | |
| 6,697,800 B1 | 2/2004 | Jannink | |
| 6,701,305 B1* | 3/2004 | Holt et al. | 706/45 |
| 6,751,600 B1 | 6/2004 | Wolin | |
| 6,778,986 B1 | 8/2004 | Stern | |
| 6,859,797 B1 | 2/2005 | Skopicki | |
| 6,947,930 B2 | 9/2005 | Anick | |
| 7,016,895 B2 | 3/2006 | Dehlinger | |
| 7,024,408 B2 | 4/2006 | Dehlinger | |
| 7,152,064 B2 | 12/2006 | Bourdoncle | |
| 7,158,983 B2 | 1/2007 | Willse | |
| 7,167,871 B2 | 1/2007 | Farahat | |
| 7,194,471 B1 | 3/2007 | Nagatsuka | |
| 7,257,530 B2 | 8/2007 | Yin | |
| 7,283,998 B2 | 10/2007 | Moon | |
| 7,296,016 B1 | 11/2007 | Farach-Colton | |
| 7,305,380 B1 | 12/2007 | Hoelzle | |
| 7,305,415 B2 | 12/2007 | Vernau | |
| 2001/0042085 A1* | 11/2001 | Peairs et al. | 707/526 |
| 2003/0101166 A1 | 5/2003 | Uchino et al. | |

(Continued)

OTHER PUBLICATIONS

J. Farkas, "Neural Networks and Document Classification", 1993, Communications Canada Centre for Information Technologies Innovation.*

(Continued)

*Primary Examiner* — Jacob F Betit
*Assistant Examiner* — Sheryl Holland

(57) ABSTRACT

A classification method and system for documents containing text sentences and images having meta-data. The classification method and system categorizes document sentences into subjective and non-subjective sentences and categorizes document images into descriptive and non-descriptive. The categorization is further used to calculate subjectivity and descriptive-images classification of a document. This classification system can be used by a web search engine to filter, sort or tag a set of document references based on user selection.

2 Claims, 5 Drawing Sheets

U.S. PATENT DOCUMENTS

| | | | | |
|---|---|---|---|---|
| 2006/0206307 A1* | 9/2006 | Sugihara et al. | ................... | 704/4 |
| 2006/0212423 A1* | 9/2006 | Jones et al. | ................... | 707/2 |
| 2006/0229865 A1* | 10/2006 | Carlgren et al. | ................... | 704/8 |
| 2006/0236229 A1* | 10/2006 | Nagao | ................... | 715/513 |
| 2007/0124319 A1* | 5/2007 | Platt et al. | ................... | 707/101 |
| 2007/0211964 A1* | 9/2007 | Agam et al. | ................... | 382/305 |
| 2007/0239433 A1* | 10/2007 | Chaski | ................... | 704/9 |

OTHER PUBLICATIONS

Hiroyuki Kawano, "Overview of Mondou Web Search Engine Using Text Mining and Information Visualizing Technologies," IEEE, 2001, pp. 234-241.

James Osborn et al "JUSTICE: A Judicial Search Tool Using Intelligent Concept Extraction," ICAIL-99, 1999, pp. 173-181, ACM.

Zipf, G. K., The Psycho-Biology of Language, (Houghton Mifflin 1935).

Brian T. Bartell, et al., "Representing Documents Using an Explicit Model of Their Similarities", Journal of the American Society for Information Science, May 1995, vol. 46, No. 4, pp. 254-271.

Paik, Woojin et al., "Interpretation of Proper Nouns for Information Retrieval," Proceedings of the ARPA Workshop on Human Language Technology, Princeton, NY, Mar. 21-24, 1993, pp. 1-5.

Paik, Woojin et al., "Categorizing and Standardizing Proper Nouns for Efficient Information Retrieval," Corpus Processing for Lexicon Acquisition, MIT Press, Cambridge, MA, 1995 (Boguraev, B. (ed)) pp. 1-10.

* cited by examiner

Find pages with all of these words: [                    ]

Written Style:  300  ○ Don't need this ○ Graphical    ○ Plain Text    ○ Subjective  ○ Objective
                    ○ Professional  ⦿ Simple & Graphical ○ Non Commercial ○ Commercial ○ Friendly How Subjective:          [No Subjective sort      ▼] [No filtering ▼]  — 320
How many Descriptive images: [sort from highest to lowest ▼] [> 0 images ▼]
                     310
                              [ Search ]

FIG. 4

USDA forest Service - Caring for the land and serving people.
Page Analysis »  Subjectivity(♥♥) • Images (📷📷📷)
lands in national forests and grasslands,... for sustainable forests and healthy public... the future of forests or of children.... Change, Kids, and Forests: What's the...
http://WWW.FS.FED.US - 13224k • 1040 words forest Preserve District of Cook County
Page Analysis »  Subjectivity(♥) • Images (📷📷📷)
Board of. Forest Preserve.... Welcome to the Forest Preserve District... learn more! >>.
Forest Preserve District... Avenue, River Forest, IL 60305....
http://www.fpdcc.com - 30331k • 256 words

→ 400

DEP: Campground Reservation Service - CT State Parks and forests
Page Analysis »  Subjectivity(♥) • Images (📷📷📷📷)
State Parks and Forests, please contact... at state park and forest campgrounds.... Legion State Forest. in Pleasant... at Pachaug State Forest in Voluntown are...
http://www.ct.gov/dep/cwp/view.asp?a=2716&Q=325042&depNav_GID=1621&depNav= - 30278k • 573 words a fool in the forest
Page Analysis »  Subjectivity(♥♥♥) • Images (📷📷📷📷📷📷)
fool in the forest. The personal &... a fool in the forest. Epigraphs. A... a fool i' the. forest,. A motley fool; a... [the. fool in the forest. store at...
http://www.mayitpleasethecourt.com/journal/external_link_go.asp?LinkID=755 - 41375k • 8431 words

→ 410

Paradise forests
Page Analysis »  Subjectivity(♥♥♥♥) • Images (📷📷📷📷📷)
to the Paradise Forests weblog:. The... The Paradise Forests are being... of the Paradise Forests. This weblog is... The Paradise Forests weblog features...
http://weblog.greenpeace.org/paradiseforests/ - 111809k • 5737 words

FIG. 5

METHOD AND SYSTEM FOR DOCUMENT CLASSIFICATION BASED ON DOCUMENT STRUCTURE AND WRITTEN STYLE

FIELD OF THE INVENTION

The present invention relates to classifying documents based on their structure and written style where the described classification can be used when searching documents to filter, sort and tag web search results.

BACKGROUND OF THE INVENTION

The World Wide Web contains millions of documents that provide large pool of information covering many subjects. Web documents are accessed via Uniform Resource Locations (URLs). Web documents are mostly represented in Hyper Text Markup Language (HTML) that can contain text, links to images or links to other web documents. Users who want to access the World Wide Web use a browser to access a specific web document URL or can use a search engine to query and find web documents with the information they are looking for. A search engine can search the World Wide Web on a frequent basis to parse, analyze, index, and store the content of web documents in addition to meta-data or attributes that describe web documents such as their creation dates, languages and authors.

Many Search engines provide multiple criteria that can be used to search and limit the search results and better zoom in on what the user is looking for. For example, a user can enter a query of one or more key words to search previously indexed web documents where key words can be separated by Boolean terms (e.g. and, or, not). Furthermore, a user can specify to limit the search to a language, a document file format, a document creation or crawled date. Furthermore, users can find which web documents link to other web documents and can limit search to sections of the web document such as the document title or document URL. As the web grows, so is the chance that more search results are returned back to the user who has to further discover the search results to find the closest match. Furthermore, users of different educational levels and ages could be searching for the same information but for different purposes and want the search results to cope with their interests.

Document classification or categorization is an information science concept that tries to assign one or more classifications to documents based on their content. This classification can be performed manually or automatically with little or no user intervention depending on the classification method. Classifications can be hierarchical where a document belongs to a branch in a hierarchical tree of categories or it can be a faceted classification where a document belongs to one or more defined classifications.

Ontology is the general knowledge representation of concepts and the relationships between them within a domain. Specifically in the field of document classification, many methods, standards and commercial systems exist to add categorization, contextual and classification information to documents for the purpose of search. One published ontology is the Simple Dublin Core Metadata Element Set which is a resource description standard used to find documents where the standard consists of 15 elements: Title, Creator, Subject, Description, Publisher, Contributor, Date, Type, Format, Identifier, Source Language, Relation, Coverage and Rights.

The Semantic Web is a web 3.0 concept that transforms web documents into data. The W3C group introduced the Resource Description Framework (RDF) language to represent information about resources in a structured readable model. Semantic web can be used by search engines to better discover resources and categorize web sites data instead of inferring web sites data. There are emerging hyper-data web browsers that use RDF to semantically represent web sites data.

In general, document classification can be either provided by the document publisher as it is the case for Semantic Web RDF language and popular domain ontologies or it can be discovered using either inference rules based on a predefined knowledge base and user experiences or on semantic modeling based on natural language processing.

A search of prior art did not disclose any patents that read directly on the claims of this invention. Some existing U.S. patents were considered to be related to the subject of using context search in addition to key words search to limit search results:

| U.S. Pat. No. | INVENTOR | ISSUED |
| --- | --- | --- |
| 7,283,998 | Moon; Charles | Oct. 16, 2007 |
| 7,167,871 | Farahat; Ayman O. | Jan. 23, 2007 |
| 7,194,471 | Nagatsuka; Tetsuro | Mar. 20, 2007 |
| 7,158,983 | Willse; Alan R. | Jan. 2, 2007 |
| 7,305,415 | Vernau; Judi | Dec. 4, 2007 |
| 7,296,016 | Farach-Colton; Martin | Nov. 13, 2007 |
| 7,305,380 | Hoelzle; Urs | Dec. 4, 2007 |
| 7,152,064 | Bourdoncle; Francois | Dec. 19, 2006 |
| 7,024,408 | Dehlinger; Peter J. | Apr. 4, 2006 |
| 7,016,895 | Dehlinger; Peter J. | Mar. 21, 2006 |
| 6,947,930 | Anick; Peter G. | Sep. 20, 2005 |
| 6,859,797 | Skopicki; Jakob | Feb. 22, 2005 |
| 6,778,986 | Stern; Jonathan | Aug. 17, 2004 |
| 6,751,600 | Wolin; Ben | Jun. 15, 2004 |
| 6,701,305 | Holt; Fredrick Baden | Mar. 2, 2004 |
| 6,697,800 | Jannink; Jan F. | Feb. 24, 2004 |
| 6,691,108 | Li; Wen-Syan | Feb. 10, 2004 |
| 6,675,159 | Lin; Albert Deirchow | Jan. 6, 2004 |
| 6,233,575 | Agrawal; Rakesh | May 15, 2001 |
| 6,189,002 | Roitblat; Herbert L. | Feb. 13, 2001 |
| 6,490,579 | Gao; Yong | Dec. 3, 2002 |
| 6,633,868 | Min; Shermann Loyall | Oct. 14, 2003 |
| 6,505,195 | Ikeda; Takahiro | Jan. 7, 2003 |
| 5,619,709 | Caid; William R. | Apr. 8, 1997 |
| 7,257,530 | Yin; Hongfeng | Aug. 14, 2007 |
| 5,424,947 | Nagao; Katashi | Jun. 13, 1995 |
| 6,327,593 | Goiffon; David A. | Dec. 4, 2001 |
| 5,761,631 | Nasukawa; Tetsuya | Jun. 2, 1998 |
| 5,963,940 | Liddy; Elizabeth D. | Oct. 5, 1999 |
| 2003/0101166 | Uchino, Kanji | May 29, 2003 |

In U.S. Pat. No. 7,167,871, an authoritative document ranking method and system that can be used to re-rank search results was described where document content features (e.g. words with learned prefixes, words with learned suffixes, words in certain grammatical locations, HTML features) where a subset of the document content features are extracted using one or more metric regression or boosted decision tree algorithms and provided to a trained document textual authority model. The textual authoritativeness value determines the reliability of the document's subject. Our patent is different in these ways:

(1) It's not an authoritative ranking method such as other Page ranking methods used by Search Engines such as "Page-Rank". Our patent is explicitly a document written style and structure classification method similar to classifying a document based on its language, domain type or copyright content.

(2) The document content features (complexity of document words, subjectivity of sentences, descriptive images) used by our method are not subject-specific and are neither extracted by any regression process nor inputted to any model for further calculation. U.S. Pat. No. 7,167,871 describes a subject-related ranking method.

(3) The classification metrics (complexity count/ratio, subjectivity count/ratio, descriptive-images count) as described by our method and system can be used by users in more than one way to filter, sort and tag search results and can be combined with each others to describe a general pre-determined context of documents. For example, "Plain and Simple" classification can mean documents with no images and low complexity.

In U.S. Pat. No. 6,778,986, a method was patented to determine a web site type by examining web site features such as external/internal links, site tree and distribution of multimedia elements where a Bayesian network is trained to use the combined test results and determine the subject web site type.

In U.S. Pat. No. 7,194,471, a document classification method for the purpose of comparing documents was described where an operator designates a classification based on selecting appropriate items contained in the document and such feature vector is used to measure the similarity between classified documents.

In U.S. Pat. No. 7,296,016, a method for providing search results relating to a point-of-view (POV) where the POV may be defined from Uniform Resource Locators (URLs), key words from previously user-selected documents and a POV can be either on-topic or off-topic URLs. The POV is used to filter and limit search results.

In U.S. Pat. No. 7,305,380, a method for limiting search results using context information that can be extracted from user access patterns, a favorites list created by a user or by presenting a hierarchical directory of category listings to the user where the context information is used to filter in or out the search results.

In U.S. Pat. No. 6,189,002, a process was described to transform the search query of a user into a semantic profile that would be compared with the semantic profiles of a cluster of previously processed documents and the documents with the closest weighted match are returned.

In U.S. Pat. No. 6,490,579, a search method was detailed where a context field being a subject area, information type or problem type are used to narrow information resources matching at least one of the context fields.

In U.S. Pat. No. 6,633,868, a method was described where a word relationship matrix is constructed for each document from word frequencies, counts and proximities and a search matrix of the query vector is compared with the document matrix to produce a document rank.

In U.S. Pat. No. 5,619,709, a method was detailed to describe how to extract and compare document contexts by constructing context vectors of document key words based on the proximity between words and the search query is converted into a context vector that is compared to stored context vectors.

In U.S. Pat. No. 7,257,530, a text mining method was described where sentences and phrases are extracted out of document text where related phrases construct a knowledge base. A user is presented with a knowledge base related to the search query and can use the knowledge base to refine search engine results.

In U.S. Pat. No. 5,424,947, a system for natural language analysis was described to analyze structural ambiguity of sentences and find dependencies between words using a background knowledge base where the system can be used in a question and answer system.

In U.S. Pat. No. 6,327,593, a method was provided to allow users to interactively modify the search index when performing concept-based searches by modifying the concepts hierarchy and associations.

In U.S. Pat. No. 5,761,631, a method was described to improve the accuracy of natural language processing by using dependency structures of well-formed sentences to analyze ill-formed grammatical sentences.

OTHER PUBLICATIONS

Hiroyuki Kawano, "Overview of Mondou Web Search Engine Using *Text Mining* And Information Visualizing Technologies," IEEE, 2001, pp. 234-241.

James Osborn et al "JUSTICE: A judicial Search Tool Using Intelligent Concept Extraction," ICAIL-99, 1999, pp. 173-181, ACM.

ZIPF, G. K., THE PSYCHO-BIOLOGY OF LANGUAGE, (Houghton Mifflin 1935).

Brian T. Bartell, et al., "Representing Documents Using an Explicit Model of Their Similarities", Journal of the American Society for Information Science, May 1995, vol. 46, No. 4, pp. 254-271.

Paik, Woojin et al., "Interpretation of Proper Nouns for Information Retrieval," Proceedings of the ARPA Workshop on Human Language Technology, Princeton, N.Y., Mar. 21-24, 1993, pp. 1-5.

Paik, Woojin et al., "Categorizing and Standardizing Proper Nouns for Efficient Information Retrieval," Corpus Processing for Lexicon Acquisition, MIT Press, Cambridge, Mass., 1995 (Boguraev, B. (ed)) pp. 1-10.

SUMMARY OF THE INVENTION

There are many document classification methods and systems that try to enhance the web search experience. This invention provides methods and systems for document classification based on textual indications and document written style and structure. The classification can be used to sort, filter or tag documents in order to optimize the web search results.

The first classification called complexity classification analyzes the document words based on the number of syllables. The complexity classification of a document or a paragraph is determined by the count or ratio of long words to short words or to the total words in a document or paragraph. The specification of long words and short words can be determined by the system or by user preferences. For example, the system can be configured to select long words having 3 or more syllables while short words having 2 or fewer syllables. When this classification is used within a web search engine, the complexity classification of documents or paragraphs can be used to filter or sort documents or paragraphs containing the same searched key words. A user can limit the search to documents with low complexity or can choose to sort documents based on their complexity. Also, each document reference in the search result set can be visually tagged using numerical values or graphics with the complexity classification so users can select the document with the complexity that matches their interests or search purpose.

The second document classification called subjectivity classification analyzes the sentences semantic based on sentences having one or more subjective pronouns. A pronoun can be subjective, objective or possessive. A sentence that begins with or contains a linguistic subjective pronoun (e.g. I, We, She, He, They, You and It) is counted as a subjective sentence even though it may not have a subjective opinion at all. However, there is a good chance that a sentence with one or more subjective pronouns could be part of a personal experience such as a blog, an opinion on a subject or a subject review. The subjectivity classification of a document or a paragraph is to be determined by the count or ratio of subjective to non-subjective sentences or to the total count of sentences in a document or paragraph. When this classification is used within a web search engine, a user can limit the search to documents with low subjectivity or can choose to sort documents based on their subjectivity. Also, each document reference in the search result set can be visually tagged using numerical values or graphical symbols with the subjectivity classification so users can select the document with subjectivity that matches their interests or search purpose.

The third document classification classifies the type of images included in documents where an image can be a design image that only contributes to the look and feel of the classified document or it can be a descriptive image that contributes to the content or subject of the document. If the document format is HTML then decorative versus descriptive-images can be distinguished by reading the "<img>" tag where a descriptive image tag will have the "alt" or "title" attribute populated or the image tag is located within an anchor "<a></a>" tag that links to a web page that has a title. The image classification of a document is determined by the count of descriptive images. When this classification is used within a web search engine, a user can limit to search documents with no descriptive images or can select to sort search results from highest to lowest number of descriptive images. Also, each document reference in the search result set can be visually tagged with the descriptive-images classification in the form of an indicative graphic or numerical value so users can select the document with descriptive-images classification that matches their interests or search purpose.

The combination of the three classifications even adds richer search experience. For example, a user can select from one of pre-combined classifications such as "simple and graphical" to mean high descriptive-images and low complexity or "casual" to mean low complexity, high subjectivity and high descriptive-images.

This new classification could be combined with a web search to enhance the user search experience especially when searching the World Wide Web where web pages are published to address different communities and the same information can be presented in different methods. For example, a 5$^{th}$ grader who is searching the web for information on "spider habitat" might want to look for pages with high number of descriptive images and low complexity while a college science student might want to search for web pages with plain text or low descriptive images and high complexity.

BRIEF DESCRIPTION OF THE DRAWINGS

FIG. 4 is a web interface illustrating how the document classification of the present invention can be used within a web search engine to sort or filter search results.

FIG. 5 is a web interface illustrating how the search result set can be tagged with the three document classifications of the present invention.

DETAILED DESCRIPTION OF THE ILLUSTRATED EMBODIMENTS

Figure 1:
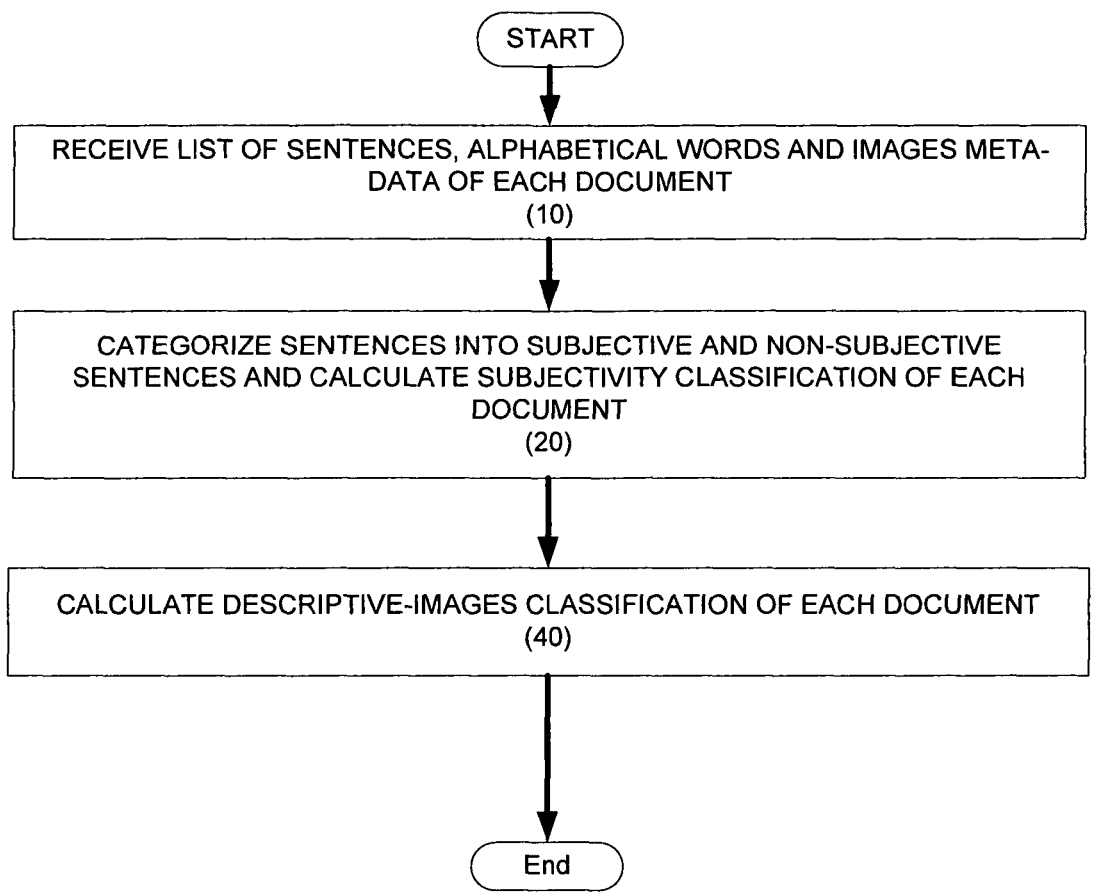
FIG. 1 shows the document classification process of the present invention.

A simple process flow that depicts this proposed method is shown in FIG. 1 where document content in the form of sentences, alphabetical words and image meta-data is to be classified (10). Sentences are categorized into subjective and non-subjective sentences where the categorization is used to calculate the subjectivity classification (20). Alphabetical words are categorized into complex and non-complex words and the categorization is used to calculate the complexity classification (30). Images are categorized into descriptive and non-descriptive images based on their meta-data and then the document descriptive-images classification is calculated (40).

Figure 2:
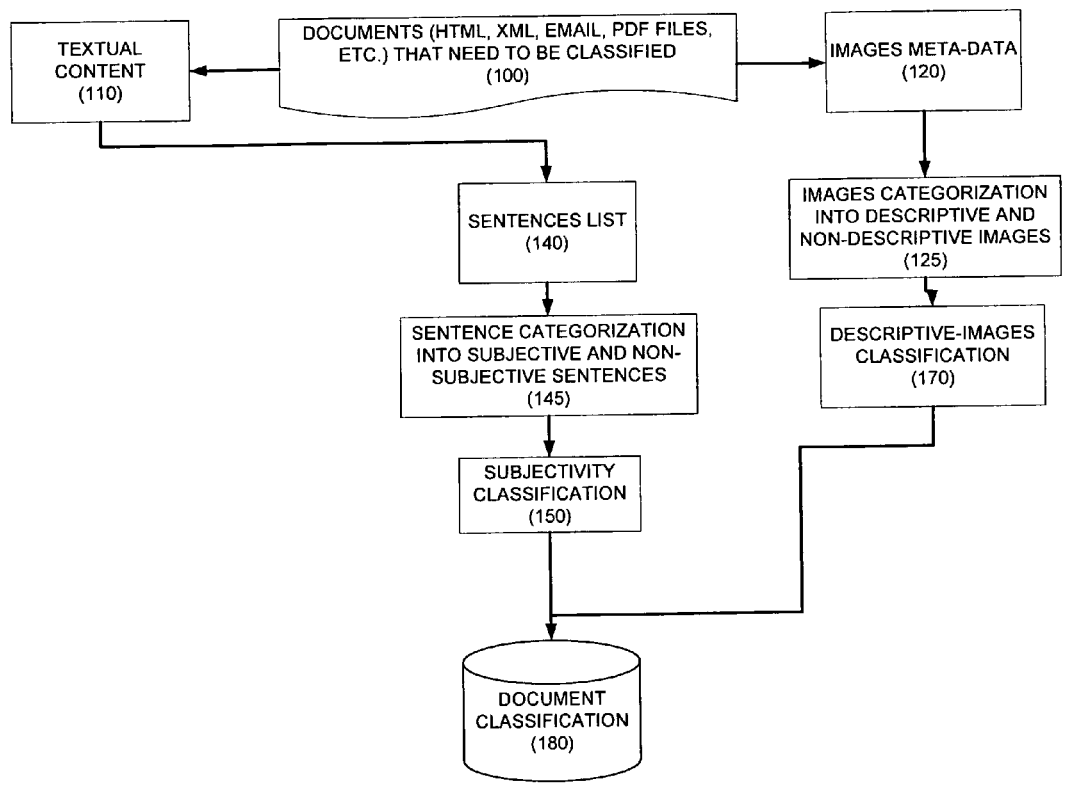
FIG. 2 shows the steps of document classification of the present invention.

FIG. 2 shows the major steps involved when implementing the document classification system of this invention. All textual documents formats such as HTML, emails, rtf and PDF can be classified (100). The textual content (110) as well as the count of descriptive images (120) are extracted out of documents using specialized document parsers that are able to produce the textual content of each document in the form of alphabetical words (130) and list of sentences (140) where a linguistic sentence is a language unit characterized mostly by the existence of a finite verb. This invention does not address how alphabetical words, linguistic sentences and descriptive images are extracted as this is a document parsing and analysis field. Alphabetical words are categorized into complex and non-complex words (135) based on the number of syllables and the complexity classification is calculated as the count of complex words or the ratio of complex words to non-complex words or total words (140). Linguistic sentences are categorized into subjective and non-subjective sentences (145) based on the existence of subjective pronouns and the subjectivity classification is calculated as the count of subjective sentences or the ratio of subjective sentences to non-subjective sentences or to the total number of sentences (150). Images meta-data are provided in form of image attributes including image title or description. The categorization into descriptive and non-descriptive-images (125) is based on the image contributing to the document subject and document look and feel respectively where images having a title or description are usually related to the document subject and will be counted as descriptive-images. The count of descriptive-images is used for the descriptive-images classification (170). All document classifications are stored in a classification database (180) for later use by other processes such as a web search engine.

Figure 3:
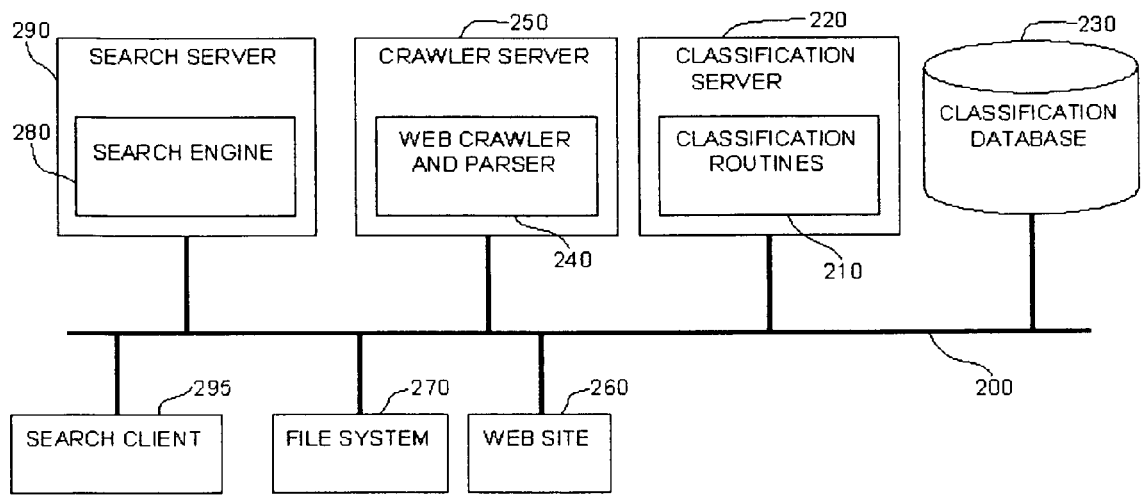
FIG. 3 is a schematic diagram illustrating a system that incorporates a method in accordance with one embodiment of the present invention.
Figure 1:
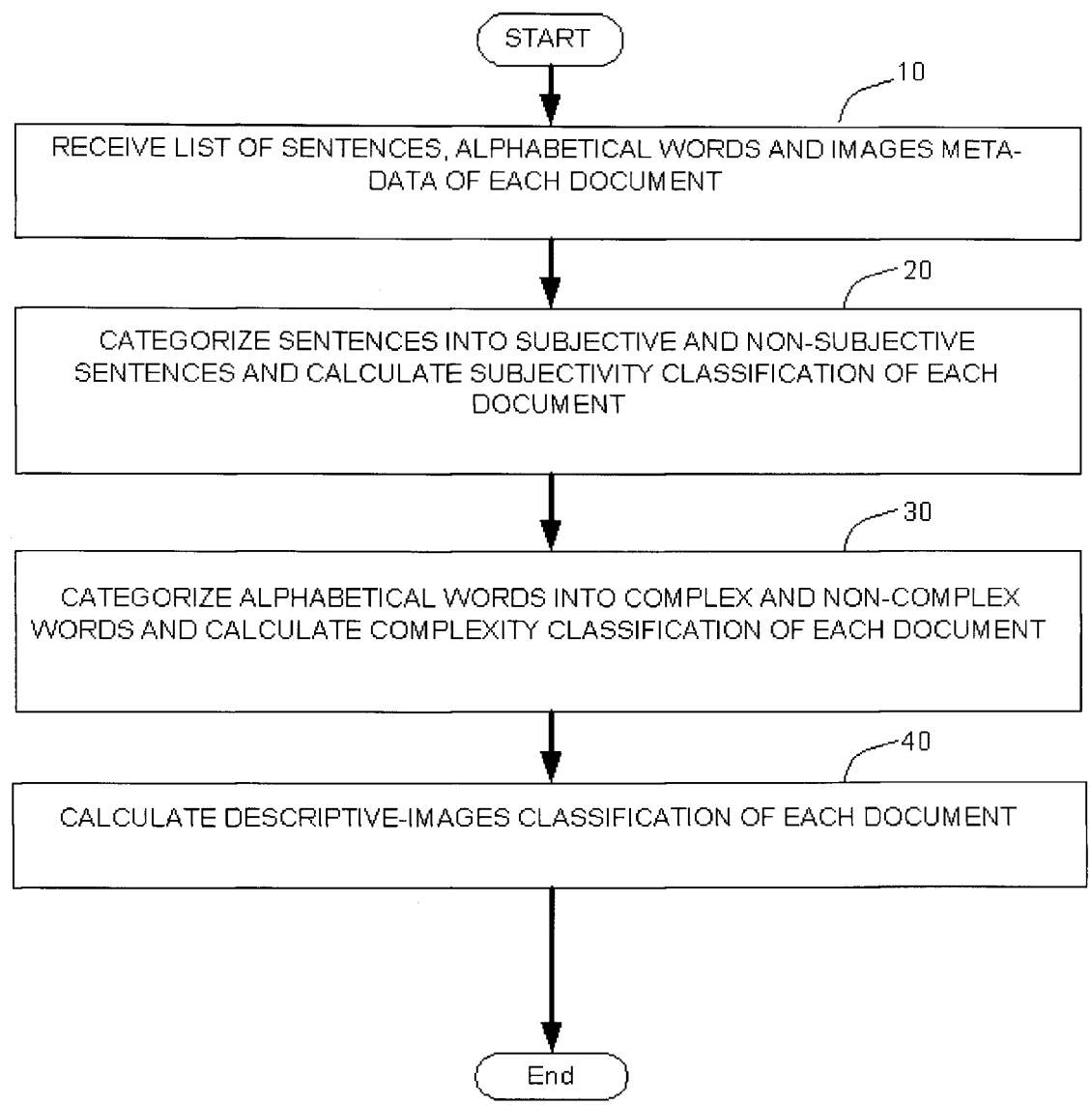
Figure 2:
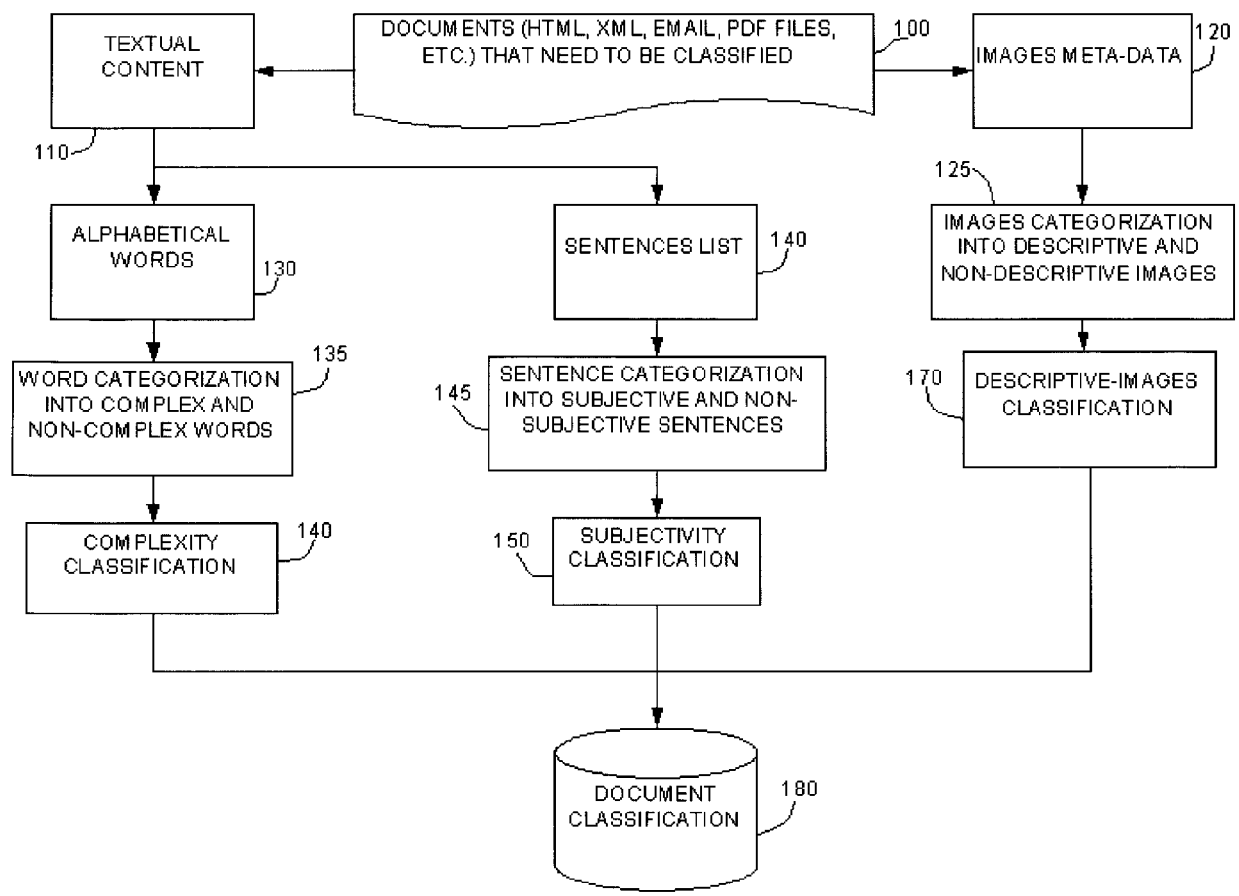

FIG. 3 shows one implementation of the document classification system comprising classification routines (210) running on one or more classification servers (220) and connected through a network (200) to a classification database (230) where document classifications as described in this invention are stored. The document classifications database (230) stores the subjectivity, complexity and descriptive-images classifications for each document where each document can be identified by a unique number, a URL or a file name. The classification routine receives the list of alphabetical words, linguistic sentences and images meta-data from a web crawler and parser (240) running on one or more crawler servers (250). The web crawler and parser can read and parse documents located on web sites (260) using a network protocol such as HTTP or can read documents located on file systems (270) using a network file system protocol such as NFS. The search engine (280) running on one or more search servers (290) is accessed by search clients (295) and when search clients search for documents, the search engine (280)

can read the classification database (230) to allow search clients (295) to sort, filter and tag search results based on document subjectivity, complexity and descriptive-images classifications.

FIG. 4 shows an example user interface of a web page where the document classification system described in this invention can be utilized within a web search engine. The example HTML web page can be accessed through a public URL via HTTP. The written style (300) options lists few document aggregate classifications where each selection automatically selects the sorting (310) and filtering (320) of the subjectivity, complexity and descriptive-images classifications list boxes. For example, a document that has a written style called "simple and graphical" can mean to have less than 10% complexity ratio, where at most 10% of alphabetical words have 3 or more syllables, and has more than 5 descriptive-images. Also, the user can sort the search result set documents based on their subjectivity, complexity and descriptive-images classifications.

FIG. 5 shows an example user interface of a web page where the search results of query word "forest" are tagged with the descriptive-images classification (400) in the form of camera images where higher number of camera images corresponds to higher descriptive-images classification of the found web page. The subjectivity classification is tagged with heart symbols (410) where higher number of hearts corresponds to higher subjectivity classification of the found web page. The complexity classification is tagged with arrow head symbols (420) where higher number of arrow tips corresponds to higher complexity classification of the found web page.

CONCLUSION

Systems and methods consistent with the present invention permit a user to filter, sort, or tag search results based on the 3 document classifications described in this invention. The use of certain words to describe each of the three classifications should not be restrictive and other equivalent or similar language synonyms could be used as long as the meaning is not altered. For example, the term "complexity" could be substituted with synonyms like difficulty or sophistication and the term "subjectivity" can be substituted with synonyms like bias, personal or influential. The abovementioned description of preferred embodiments of the present invention provides examples and descriptions, but is not intended to be comprehensive or to limit the invention to the precise form disclosed. Variations or Modifications are possible in light of the above knowledge or may be acquired from practice of the invention. For example, the web search query page in FIG. 4 and web results page in FIG. 5 are examples of how such classifications can be used in the context of web search but can be modified in other implementations consistent with the present invention. While it has been described that the classification routines 210, web crawler and parser 240 and search engine 280 perform the acts described above with regard to FIGS. 2 and 3, this need not be the case. In other implementations consistent with the present invention, all servers 220, 250 and 290 may perform one or more of the acts.

What is claimed is:
1. A method for determining the subjectivity, complexity and descriptive image classifications for a plurality of documents containing text sentences, alphabetic words and images having meta-data, comprising:

for each document of a plurality of documents:
a) categorizing at least one sentence as a subjective sentence and at least one sentence as non-subjective sentence;
wherein the at least one subjective sentence is categorized as a subjective sentence because the sentence includes one or more pronouns of the group: I, we, he, she, they or you; and
wherein the at least one non-subjective sentence is categorized as a non-subjective sentence because the sentence does not include one or more pronouns of the group: I, we, he, she, they or you;
b) categorizing at least one alphabetical word as a complex word and at least one alphabetical word as a non-complex word;
wherein the at least one complex word is categorized as a complex word because the number of syllables is over a threshold number of syllables; and
wherein the at least one non-complex word is categorized as a non-complex word because the number of syllables is less than a threshold number of syllables;
c) categorizing at least one image as descriptive image and at least one image as non-descriptive;
wherein the at least one descriptive image is categorized as a descriptive image because the at least one descriptive image includes an image size greater than a designated image size and the image meta-data includes a title or description; and
wherein the at least one non-descriptive image is categorized as a non-descriptive image because the at least one non-descriptive image includes an image size less than a designated image size or the image meta-data does not include a title or a description;
d) designating a document subjectivity classification that is equal to the ratio of subjective sentences to non-subjective sentences; and
designating a document complexity classification that is equal to the ratio of complex alphabetical words to non-complex alphabetical words; and
designating a document descriptive image classification that is equal to the total number of the descriptive images in a document;
e) wherein the subjectivity classification, the complexity classification and the descriptive image classification are associated with the document and stored in a database;
designating at least one document of the plurality of documents as a subjective document because its subjectivity classification is higher than a predetermined value;
designating at least one document of the plurality of documents as a non-subjective document because its subjectivity classification is lower than a predetermined value;
designating at least one document of the plurality of documents as a complex document because its complexity classification is higher than a predetermined value;
designating at least one document of the plurality of documents as a non-complex document because its complexity classification is lower than a predetermined value.

2. A document classification system for determining the subjectivity, complexity and descriptive image classifications for a plurality of documents containing text sentences, alphabetic words and images having meta-data, comprising:
at least one non-transitory computer readable medium; and
at least one processor; and instructions stored on the at least one non-transitory computer readable medium which when executed by the at least one processor are configured to perform the following steps:

for each document of a plurality of documents:
- a) categorizing at least one sentence as a subjective sentence and at least one sentence as non-subjective sentence;
    wherein the at least one subjective sentence is categorized as a subjective sentence because the sentence includes one or more pronouns of the group: I, we, he, she, they or you; and
    wherein the at least one non-subjective sentence is categorized as a non-subjective sentence because the sentence does not include one or more pronouns of the group: I, we, he, she, they or you;
- b) categorizing at least one alphabetical word as a complex word and a non-complex word;
    wherein the at least one alphabetical word is categorized as complex if the number of syllables is over a threshold; and
    wherein the at least one alphabetical word is categorized as non-complex if the number of syllables is less than a threshold value;
- c) categorizing at least one image as descriptive image and at least one image as non-descriptive;
    wherein the at least one descriptive image is categorized as a descriptive image because the at least one descriptive image includes an image size greater than a designated size and the image meta-data includes a title or description; and
    wherein the at least one non-descriptive image is categorized as a non-descriptive image because the at least one non-descriptive image includes an image size less than a designated image size or the image meta-data does not include a title or a description; and
- d) designating a document subjectivity classification that is equal to the ratio of subjective sentences to non-subjective sentences; and
    designating a document complexity classification that is equal to the ratio of complex alphabetical words to non-complex alphabetical words; and
    designating a document descriptive image classification that is equal to the total number of the descriptive images per document; and
- e) wherein the subjectivity classification, the complexity classification and the descriptive image classification are associated with the document and stored in a database;

designating at least one document of the plurality of documents as a subjective document because its subjectivity classification is higher than a predetermined value; and designating at least one document of the plurality of documents as a non-subjective document because its subjectivity classification is lower than a predetermined value; and designating at least one document of the plurality of documents as a complex document because its complexity classification is higher than a predetermined value; and designating for each document of the plurality of documents as a non-complex document because its complexity classification is lower than a predetermined value.

* * * * *

UNITED STATES PATENT AND TRADEMARK OFFICE
CERTIFICATE OF CORRECTION

PATENT NO. : 8,082,248 B2
APPLICATION NO. : 12/129596
DATED : December 20, 2011
INVENTOR(S) : Rania Abouyounes It is certified that error appears in the above-identified patent and that said Letters Patent is hereby corrected as shown below:

The Title Page showing an illustrative figure, should be deleted and substitute therefor the attached Title Page.

On the Title Page, Item (57) should read,

A document classification method and system based on document structure and style. The classification method and system categorizes document alphabetical words into complex and non-complex words, categorizes document linguistic sentences into subjective and non-subjective sentences and categorizes document images into descriptive and non-descriptive. The categorization is further used to calculate a complexity, subjectivity and descriptive-images classification of a document. This classification system can be used by a web search engine to filter, sort or tag a set of document references based on user selection.

The following 4 pages include the 4 drawings Fig 1, 2, 4 and 5 instead of the current Fig 1, 2, 4 and 5.

Signed and Sealed this
Twenty-sixth Day of February, 2013

Teresa Stanek Rea
*Acting Director of the United States Patent and Trademark Office*

(12) United States Patent
Abouyounes

(10) Patent No.: US 8,082,248 B2
(45) Date of Patent: Dec. 20, 2011

(54) METHOD AND SYSTEM FOR DOCUMENT CLASSIFICATION BASED ON DOCUMENT STRUCTURE AND WRITTEN STYLE

(75) Inventor: Rania Abouyounes, Windsor (CA)

(73) Assignee: Rania Abouyounes, Windsor, ON, CA (US)

( * ) Notice: Subject to any disclaimer, the term of this patent is extended or adjusted under 35 U.S.C. 154(b) by 470 days.

(21) Appl. No.: 12/129,596

(22) Filed: May 29, 2008

(65) Prior Publication Data
US 2009/0300046 A1    Dec. 3, 2009

(51) Int. Cl.
*G06F 7/04* (2006.01)
*G06F 7/06* (2006.01)

(52) U.S. Cl. .................................. 707/731; 707/739
(58) Field of Classification Search .............. 707/771, 707/999.007, 731, 739
See application file for complete search history.

(56) References Cited

U.S. PATENT DOCUMENTS

| | | |
|---|---|---|
| 5,424,947 A | 6/1995 | Nagao |
| 5,619,709 A | 4/1997 | Caid |
| 5,761,631 A | 6/1998 | Nasukawa |
| 5,963,940 A | 10/1999 | Liddy |
| 6,189,002 B1 | 2/2001 | Roitblat |
| 6,233,575 B1 | 5/2001 | Agrawal |
| 6,327,593 B1 | 12/2001 | Goiffon |
| 6,490,579 B1 | 12/2002 | Gao |
| 6,505,195 B1 | 1/2003 | Ikeda |
| 6,633,868 B1 | 10/2003 | Min |
| 6,675,159 B1 | 1/2004 | Lin |
| 6,691,108 B2 | 2/2004 | Li |
| 6,697,800 B1 | 2/2004 | Jannink |
| 6,701,305 B1 * | 3/2004 | Holt et al. .................. 706/45 |
| 6,751,600 B1 | 6/2004 | Wolin |
| 6,778,986 B1 | 8/2004 | Stern |
| 6,859,797 B1 | 2/2005 | Skopicki |
| 6,947,930 B2 | 9/2005 | Anick |
| 7,016,895 B2 | 3/2006 | Dehlinger |
| 7,024,408 B2 | 4/2006 | Dehlinger |
| 7,152,064 B2 | 12/2006 | Bourdoncle |
| 7,158,983 B2 | 1/2007 | Willse |
| 7,167,871 B2 | 1/2007 | Farahat |
| 7,194,471 B1 | 3/2007 | Nagatsuka |
| 7,257,530 B2 | 8/2007 | Yin |
| 7,283,998 B2 | 10/2007 | Moon |
| 7,296,016 B1 | 11/2007 | Farach-Colton |
| 7,305,380 B1 | 12/2007 | Hoelzle |
| 7,305,415 B2 | 12/2007 | Vernau |
| 2001/0042085 A1 * | 11/2001 | Peairs et al. .................. 707/526 |
| 2003/0101166 A1 | 5/2003 | Uchino et al. |

(Continued)

OTHER PUBLICATIONS

J. Farkas, "Neural Networks and Document Classification", 1993, Communications Canada Centre for Information Technologies Innovation.*

(Continued)

*Primary Examiner* — Jacob F Betit
*Assistant Examiner* — Sheryl Holland

(57) ABSTRACT

A classification method and system for documents containing text sentences and images having meta-data. The classification method and system categorizes document sentences into subjective and non-subjective sentences and categorizes document images into descriptive and non-descriptive. The categorization is further used to calculate subjectivity and descriptive-images classification of a document. This classification system can be used by a web search engine to filter, sort or tag a set of document references based on user selection.

2 Claims, 5 Drawing Sheets

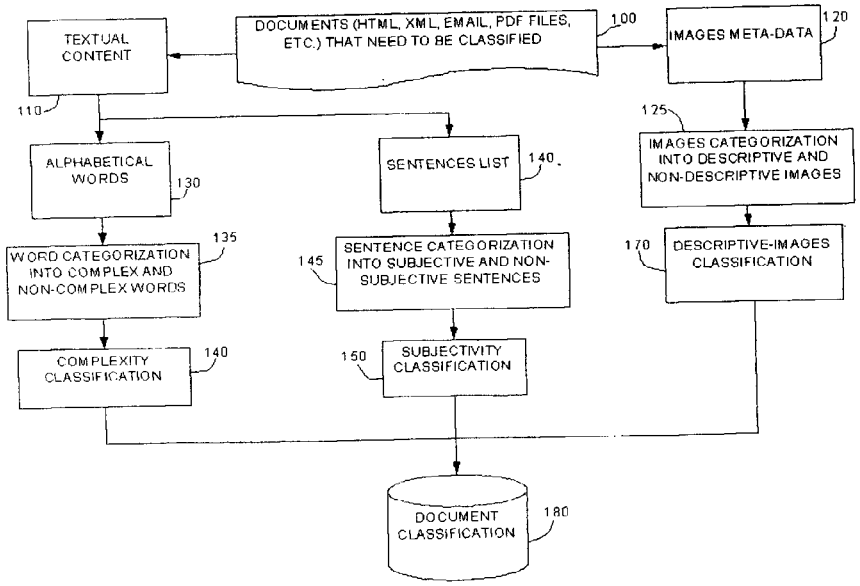

Find pages with all of these words: [            ]

Written Style: 300
How Complicated:
How Subjective:
How many Descriptive images:
310

○ Don't need this  ○ Graphical      ○ Plain Text      ○ Subjective  ○ Objective
○ Professional    ⦿ Simple & Graphical  ○ Non Commercial  ○ Commercial  ○ Friendly
No Complicated sort         < 5%
No Subjective sort          No filtering
sort from highest to lowest  > 0 images
320

FIG. 4

USDA forest Service - Caring for the land and serving people.
Page Analysis » Complexity(▶ ▶ ▶ ▶) • Subjectivity(♥♥) • Images (▬▬▬)
lands in national forests and grasslands,... for sustainable forests and healthy public... the future of forests or of children.... Change, Kids, and Forests: What's the...
http://WWW.FS.FED.US - 13224k • 1040 words forest Preserve District of Cook County
Page Analysis » Complexity(▶ ▶ ▶) • Subjectivity(♥) • Images (▬▬▬) ⟶ 400
Board of. Forest Preserve.... Welcome to the Forest Preserve District... learn more! >>.
Forest Preserve District... Avenue, River Forest, IL 60305....
http://www.fpdcc.com - 30331k • 256 words

DEP: Campground Reservation Service - CT State Parks and forests
Page Analysis » Complexity(▶ ▶ ▶) • Subjectivity(♥) • Images (▬▬▬▬)
State Parks and Forests, please contact... at state park and forest campgrounds.... Legion State Forest. in Pleasant... at Pachaug State Forest in Voluntown are...
http://www.ct.gov/dep/cwp/view.asp?a=2716&Q=325042&depNav_GID=1621&depNav= - 30278k • 573 words a fool in the forest
Page Analysis » Complexity(▶ ▶ ▶) • Subjectivity(♥♥♥) • Images (▬▬▬▬▬)
fool in the forest. The personal &... a fool in the forest. Epigraphs. A... a fool i' the. forest,. A motley fool; a... [the. fool in the forest. store at...
http://www.mayitpleasethecourt.com/journal/external_link_go.asp?LinkID=755 - 41375k • 8431 words

Paradise forests
Page Analysis » Complexity(▶ ▶) • Subjectivity(♥♥♥♥) • Images (▬▬▬▬▬)
to the Paradise Forests weblog:. The... The Paradise Forests are being... of the Paradise Forests. This weblog is... The Paradise Forests weblog features...
http://weblog.greenpeace.org/paradiseforests/ - 111809k • 5737 words

⟶ 410

20th Year Reunion - forest Lake Academy Class of '85 - maxiluna -
Page Analysis » Complexity(▶ ▶ ▶) • Subjectivity(φ) • Images (▬▬▬▬▬▬▬▬▬)
Reunion - Forest Lake Academy Class...
http://home.cfl.rr.com/maxiluna - 24648k • 18 words

⟶ 420

ICP forests: Participating countries
Page Analysis » Complexity(▶ ▶ ▶ ▶) • Subjectivity(φ) • Images (▬▬▬▬▬▬▬▬▬)
Rep. ICP Forests Manual. ICP... Manual. ICP Forests Others. Scientific... in the ICP Forests.
Please select a... Centre. Experts Forest Growth. PCG....
http://www.icp-forests.org/ChairPart.htm - 15178k • 207 words

FIG. 5